(12) United States Patent
Persico et al.

(10) Patent No.: US 11,059,143 B2
(45) Date of Patent: Jul. 13, 2021

(54) TOOL CARRIER ASSEMBLY FOR USE AT A LATHE AND LATHE HAVING SUCH TOOL CARRIER ASSEMBLY

(71) Applicant: GILDEMEISTER ITALIANA S.P.A., Brembate di Sopra (IT)

(72) Inventors: Enrico Persico, Alzano Lombardo (IT); Gianfranco Castelli, Valbrembo (IT)

(73) Assignee: GILDEMEISTER ITALIANA S.P.A., Brembate di Sopra (IT)

( * ) Notice: Subject to any disclaimer, the term of this patent is extended or adjusted under 35 U.S.C. 154(b) by 23 days.

(21) Appl. No.: 16/503,821

(22) Filed: Jul. 5, 2019

(65) Prior Publication Data
US 2020/0009662 A1 Jan. 9, 2020

(30) Foreign Application Priority Data

Jul. 4, 2018 (EP) .................................... 18181750

(51) Int. Cl.
*B23Q 39/02* (2006.01)
*B23Q 16/04* (2006.01)
(Continued)

(52) U.S. Cl.
CPC ............ *B23Q 39/024* (2013.01); *B23B 3/065* (2013.01); *B23Q 1/621* (2013.01); *B23Q 5/04* (2013.01);
(Continued)

(58) Field of Classification Search
CPC ............ Y10T 29/5174; Y10T 29/5173; Y10T 29/5168; Y10T 29/5114; Y10T 82/2587;
(Continued)

(56) References Cited

U.S. PATENT DOCUMENTS

| | | | | |
|---|---|---|---|---|
| 1,094,622 A | * | 4/1914 | Bancroft et al. | B23Q 1/621 29/54 |
| 2,348,908 A | * | 5/1944 | Jacobs | B23B 29/248 29/445 |

(Continued)

FOREIGN PATENT DOCUMENTS

| CH | 668206 A | * | 12/1988 |
|---|---|---|---|
| CN | 201 931 309 U | | 8/2011 |

(Continued)

OTHER PUBLICATIONS

Machine Translation of CH 668206 A, which CH '206 was published Dec. 1988.*

(Continued)

*Primary Examiner* — Erica E Cadugan
(74) *Attorney, Agent, or Firm* — Oliff PLC

(57) ABSTRACT

A tool carrier assembly for use at a machine tool, which includes at least one workpiece-carrying spindle for rotatably driving a workpiece received in the workpiece-carrying spindle. The tool carrier assembly includes a first slide being movable in a first direction, a tool carrier being supported on the first slide and configured to hold a plurality of tools, a tool drive unit including a tool drive for engaging with one of the plurality of tools held by the tool carrier to rotatably drive said tool, when the tool is arranged at a tool drive position with respect to the tool drive, and a drive mechanism for driving movement of the first slide together with the tool carrier in the first direction relative to the tool drive position, when the tool drive is disengaged with the tool, to relatively move another tool of the plurality of tools into the tool drive position.

15 Claims, 10 Drawing Sheets

(51) Int. Cl.
    *B23Q 5/04* (2006.01)
    *B23B 11/00* (2006.01)
    *B23B 29/24* (2006.01)
    *B23Q 1/62* (2006.01)
    *B23B 3/06* (2006.01)
    *B23Q 11/10* (2006.01)
    *B23Q 16/00* (2006.01)
    *B23Q 39/00* (2006.01)

(52) U.S. Cl.
    CPC .............. *B23Q 11/10* (2013.01); *B23Q 16/00* (2013.01); *B23Q 2039/006* (2013.01); *B23Q 2039/008* (2013.01); *Y10T 29/5114* (2015.01); *Y10T 29/5174* (2015.01)

(58) Field of Classification Search
    CPC .... Y10T 29/5109–5114; Y10T 29/5152–5175; B23B 3/065; B23B 11/00; B23B 1/00–25/00; B23B 29/24–29/34; B23Q 39/024; B23Q 2039/008; B23Q 5/04–5/20; B23Q 16/02–16/046; B23Q 16/08–16/086
    USPC ............. 29/55, 54, 50, 27 R–27 C, 35.5–56; 82/159
    See application file for complete search history.

(56) References Cited

U.S. PATENT DOCUMENTS

| | | | |
|---|---|---|---|
| 4,587,697 A | 5/1986 | Link et al. | |
| 5,210,917 A * | 5/1993 | Piguet | B23Q 7/045 29/27 R |
| 7,313,850 B2 * | 1/2008 | Miller | B23B 3/065 29/27 C |
| 2013/0008002 A1 * | 1/2013 | Ueno | B23Q 15/24 29/27 C |
| 2016/0256932 A1 | 9/2016 | Theurillat | |

FOREIGN PATENT DOCUMENTS

| | | |
|---|---|---|
| DE | 2147191 A1 * | 3/1973 |
| EP | 1 321 212 A1 | 6/2003 |
| EP | 1 543 917 A1 | 6/2005 |
| FR | 2684906 A1 * | 6/1993 |
| JP | 61-197103 A * | 9/1986 |
| WO | WO-2015/154634 A1 * | 10/2015 |

OTHER PUBLICATIONS

Machine Translation of DE 2147191 A1, which DE '191 was published Mar. 1973.*

Feb. 13, 2019 Search Report issued in European Patent Application No. 18181750.3.

* cited by examiner

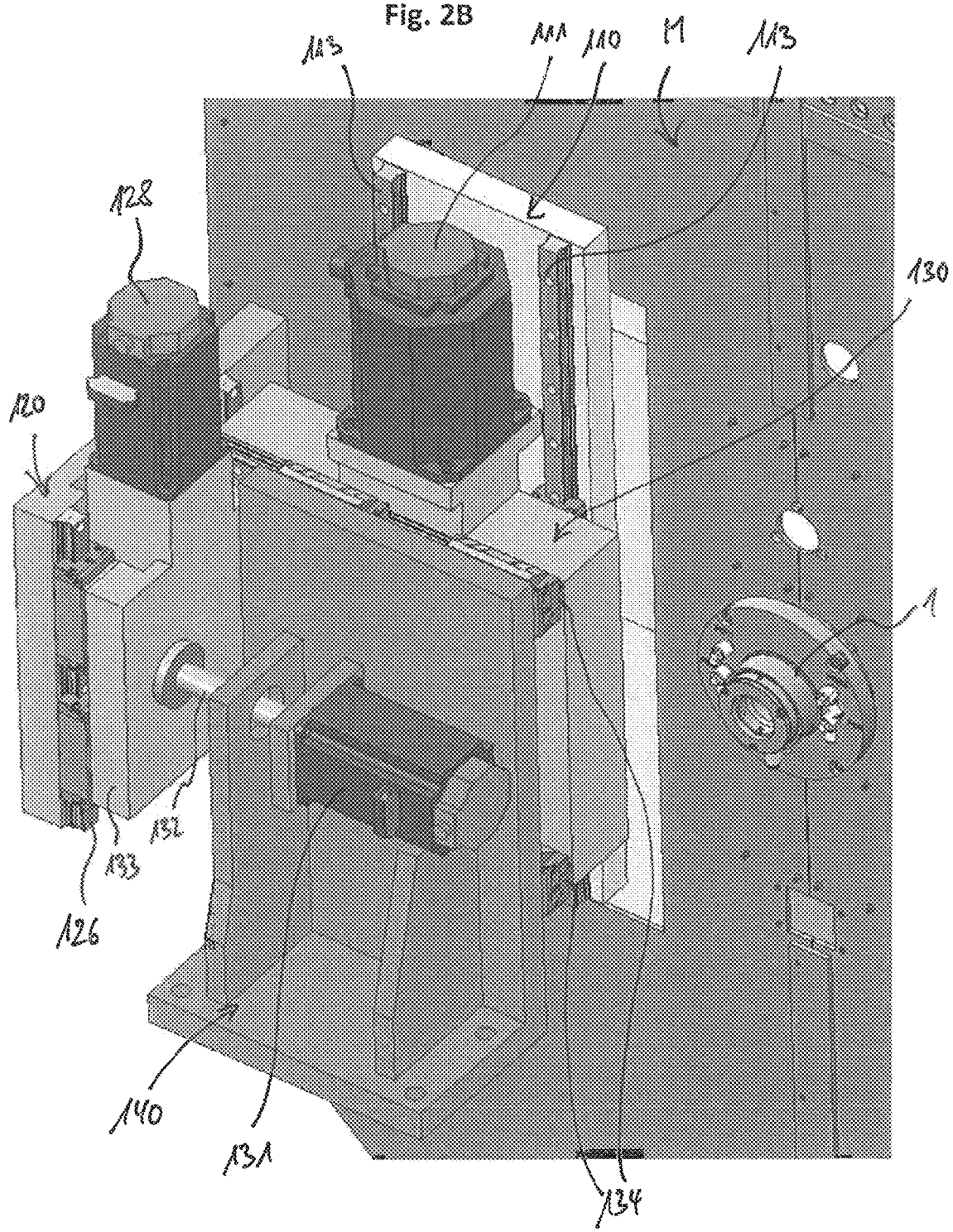

TOOL CARRIER ASSEMBLY FOR USE AT A LATHE AND LATHE HAVING SUCH TOOL CARRIER ASSEMBLY

The present disclosure relates to a tool carrier assembly for use at a machine tool, in particular a lathe, which comprises at least one workpiece-carrying spindle for rotatably driving a workpiece received in the workpiece-carrying spindle, and a machine tool, in particular a lathe, having such tool carrier assembly.

BACKGROUND

In the prior art, there are known numerically controlled machine tools, such as milling machines or lathes. Typically, milling machines have one or more tool-carrying spindles for rotatably driving cutting tools, which are received in the tool-carrying spindles, with respect to a workpiece, whereas lathes typically have one or more workpiece-carrying spindles for rotatably driving workpieces, which are received in the workpiece-carrying spindles, with respect to a tool.

In such machine tools, it is desired to provide tool assemblies for machining the workpiece, being compact and robust, but at the same time allowing for machining versatility by multiple tool options, including rotationally-driven live tools and fixed tools, and efficient tool changes thereof, while further providing multiple movement options for the tools at a compact arrangement.

In view of the above, it is an object of the present invention to provide an efficient and compact, versatile tool carrier assembly at a machine tool having a workpiece-carrying spindle.

SUMMARY

For solving the above object, according to exemplary aspects of the invention, there is proposed a tool carrier assembly and a machine tool, in particular a lathe.

According to exemplary aspects, there is proposed a tool carrier assembly for use at a machine tool, in particular a lathe. The machine tool may particularly comprise at least one workpiece-carrying spindle for rotatably driving a workpiece received in the workpiece-carrying spindle.

The tool carrier assembly may comprise a first slide being movable in a first direction which may be arranged transverse or perpendicular to a spindle axis of the workpiece-carrying spindle.

The tool carrier assembly may comprise a tool carrier configured to hold a plurality of tools arranged adjacent to each other along the first direction (preferably in a row-like arrangement with the row extending in the/along the first direction, and in particular preferably at regular distances amongst each other), wherein the tool carrier may be supported on the first slide.

Furthermore, the tool carrier assembly may comprise a tool drive unit including a tool drive for engaging with one of the plurality of tools held by the tool carrier to rotatably drive said tool, when said tool is arranged at a tool drive position with respect to the tool drive.

The tool carrier assembly may include a drive mechanism for driving movement of the first slide, preferably together with the tool carrier, in the first direction relative to the tool drive position, when the tool drive is disengaged with said tool, for example, to relatively move another tool of the plurality of tools into the tool drive position.

According to further exemplary aspects, there is proposed a machine tool, in particular a lathe, comprising at least one workpiece-carrying spindle for rotatably driving a workpiece received in the workpiece-carrying spindle, and a tool carrier assembly as described above and/or below.

In the following, further preferred and exemplary aspects and modifications are exemplarily described.

In some exemplary aspects, the tool carrier may comprise, preferably for a plurality of tools or for each tool, a respective associated nozzle for providing cooling liquid for the respective tool, each nozzle being preferably connected to a respective associated cooling liquid inlet of the tool carrier.

Preferably, the tool drive unit may further comprise a cooling liquid supply outlet configured to engage into a releasable connection with the one of the cooling liquid inlets of the tool carrier which is connected with the respective nozzle associated with said tool arranged at the tool drive position with respect to the tool drive of the tool drive unit.

In some exemplary aspects, the tool carrier preferably comprises, preferably for a plurality of tools or for each tool, a respective tool receiving portion for receiving a fixed tool or a rotatably-driven tool. Preferably, rotatably driven tools are held and/or rotatably supported in respective tool holder cartridges received in the respective tool receiving portions.

Preferably, one or more or each of the tool holder cartridges may include, preferably at its end on an opposite side with respect to the tool held by the respective tool holder cartridge, a respective drive element of a tongue-and-groove coupling preferably configured to releasably engage with an opposite drive element of the tongue-and-groove coupling included in the tool drive, when said tool held by the respective tool holder cartridge is arranged at the tool drive position with respect to the tool drive.

In particularly preferable exemplary aspects, the tool carrier assembly comprises, preferably in addition to the first slide being movable in the first direction, a second slide being movable in another second direction different from the first direction.

Herein preferably, the second slide may support the tool drive unit and/or the first slide, and the second slide may be movable in the second direction being arranged axially or in parallel with the spindle axis. The drive mechanism may be further configured to drive movement of the second slide in the second direction.

In some other particularly preferable exemplary aspects, the tool carrier assembly comprises, preferably in addition to the first slide being movable in the first direction, a second slide being movable in the first direction, i.e. in parallel to the movement of the first slide. The drive mechanism may be configured to drive movement of the first and second slides in the first direction. The second slide may support the tool drive unit.

Herein preferably, the first slide may preferably support the tool carrier configured to hold the plurality of tools arranged adjacent to each other along the first direction and the second slide may preferably support the tool drive for engaging with one of the plurality of tools to rotatably drive said tool, when said tool is arranged at a tool drive position with respect to the tool drive.

In the above exemplary aspects, the tool carrier assembly may comprise a third slide being movable in a second direction other than the first direction. The second direction may be arranged transverse or perpendicular to the first direction and/or transverse or perpendicular to the spindle axis. The first and/or second slides may preferably be arranged on the third slide.

In some exemplary aspects, the drive mechanism may be configured to drive a joint movement of the first and second slides in the first direction, preferably when the tool drive is engaged with said tool, for example, for machining a workpiece received in the workpiece-carrying spindle with said tool.

In some exemplary aspects, the drive mechanism may be configured to drive a relative movement of the first slide with respect to the second slide, preferably when the tool drive is disengaged with said tool, for example, to relatively move another tool of the plurality of tools into the tool drive position.

In some exemplary aspects, for example, for driving the relative movement of the first slide with respect to the second slide, the drive mechanism may be configured to drive at least one of a movement of the first slide with respect to the second slide in the first direction and a movement of the second slide with respect to the first slide in the first direction. That is, the drive mechanism may be configured to drive the movement of the first slide with respect to the second slide in the first direction and/or the movement of the second slide with respect to the first slide in the first direction.

In some exemplary aspects, the drive mechanism may include a first drive for driving movement of the first slide in the first direction and/or a second drive for driving movement of the second slide in the first direction.

In some exemplary aspects, the first and second drives may be configured to be operated in a synchronized operation mode, in particular preferably under control of an NC-control unit of the machine tool or an independent NC-control unit or sub-control unit of the tool carrier assembly system operating in cooperation with an NC-control unit of the machine tool, for example, for synchronized driving of the joint movement of the first and second slides in the first direction by the first and second drives.

In some exemplary aspects, at least one of the first and/or second drives may be configured to be operated in an independent operation mode, for example, for driving the relative movement of the first slide with respect to the second slide by the first and/or second drives.

In some other exemplary aspects, the drive mechanism may include a drive, such as for example a single drive, for driving movement of either the first slide or the second slide in the first direction. Preferably herein the other slide may not have another drive for driving into the first direction.

Preferably herein, the drive mechanism may include a releasable fixing mechanism configured to actuate a fixed attachment between the first and second slides, for example, for driving the joint movement of the first and second slides in the first direction by the drive.

In some exemplary aspects, the releasable fixing mechanism may further be configured to release the fixed attachment between the first and second slides for driving the relative movement of the first slide with respect to the second slide by the drive.

In some exemplary aspects, the releasable fixing mechanism may include an electric, hydraulic and/or pneumatic first actuator, preferably arranged on one of the first and second slides, preferably being configured to engage with an engagement portion arranged on the other one of the first and second slides.

In some exemplary aspects, the releasable fixing mechanism may include an electric, hydraulic and/or pneumatic second actuator, preferably arranged on the one of the first and second slides not driven by the drive, preferably being configured to engage with another engagement portion which may be arranged on a support part, in particular a third slide, which preferably supports the one of the first and second slides not driven by the drive, when the drive is driving the relative movement of the first slide with respect to the second slide by the drive.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible. Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

BRIEF DESCRIPTION OF THE FIGURES

FIG. 2B exemplarily shows a perspective back-side view of the tool carrier assembly of FIG. 2A.

DETAILED DESCRIPTION

Figure 1A:
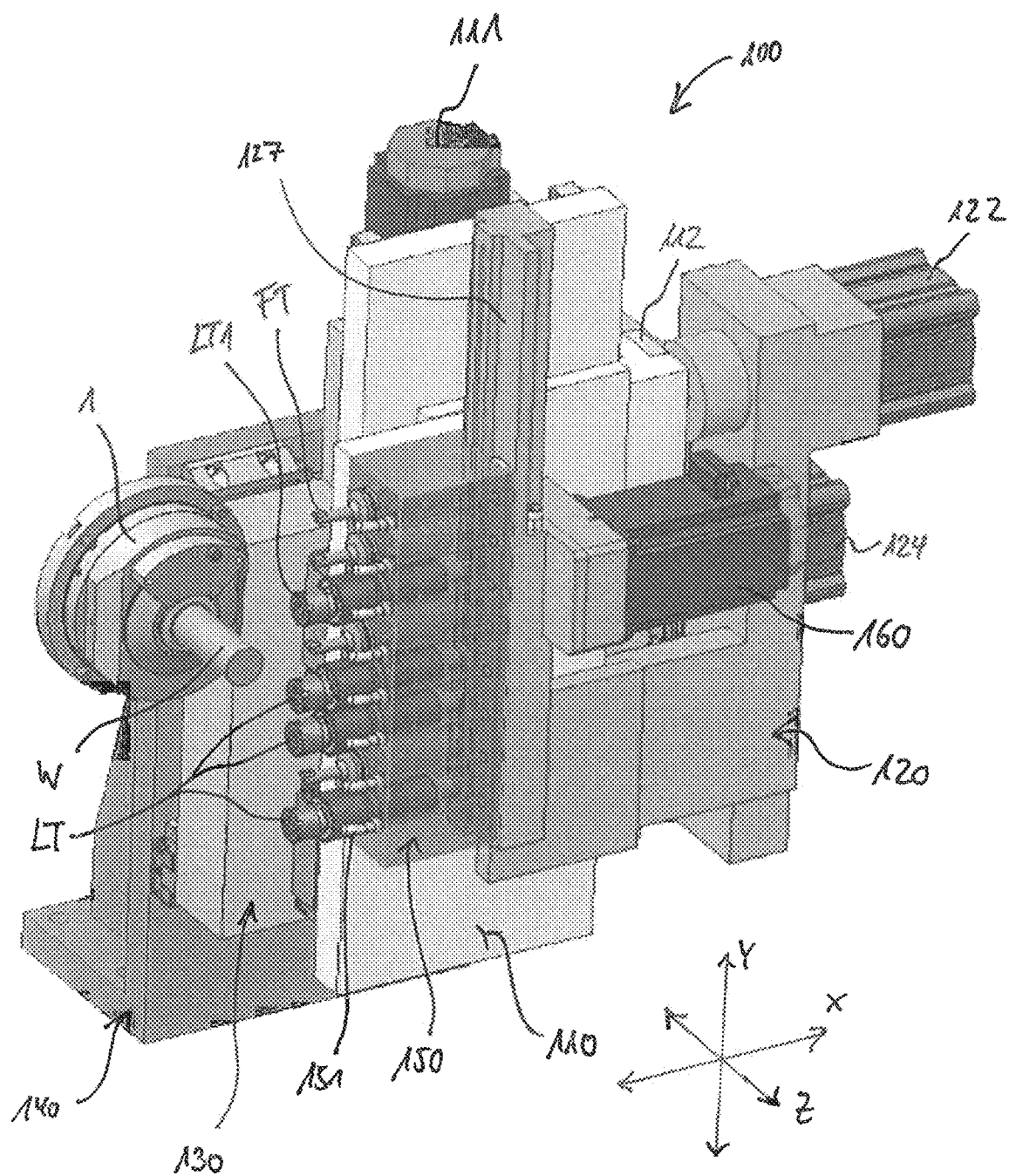
FIG. 1A exemplarily shows a perspective front-side view of a tool carrier assembly according to an exemplary first embodiment.

In the following, preferred aspects and exemplary embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

Figure 1B:
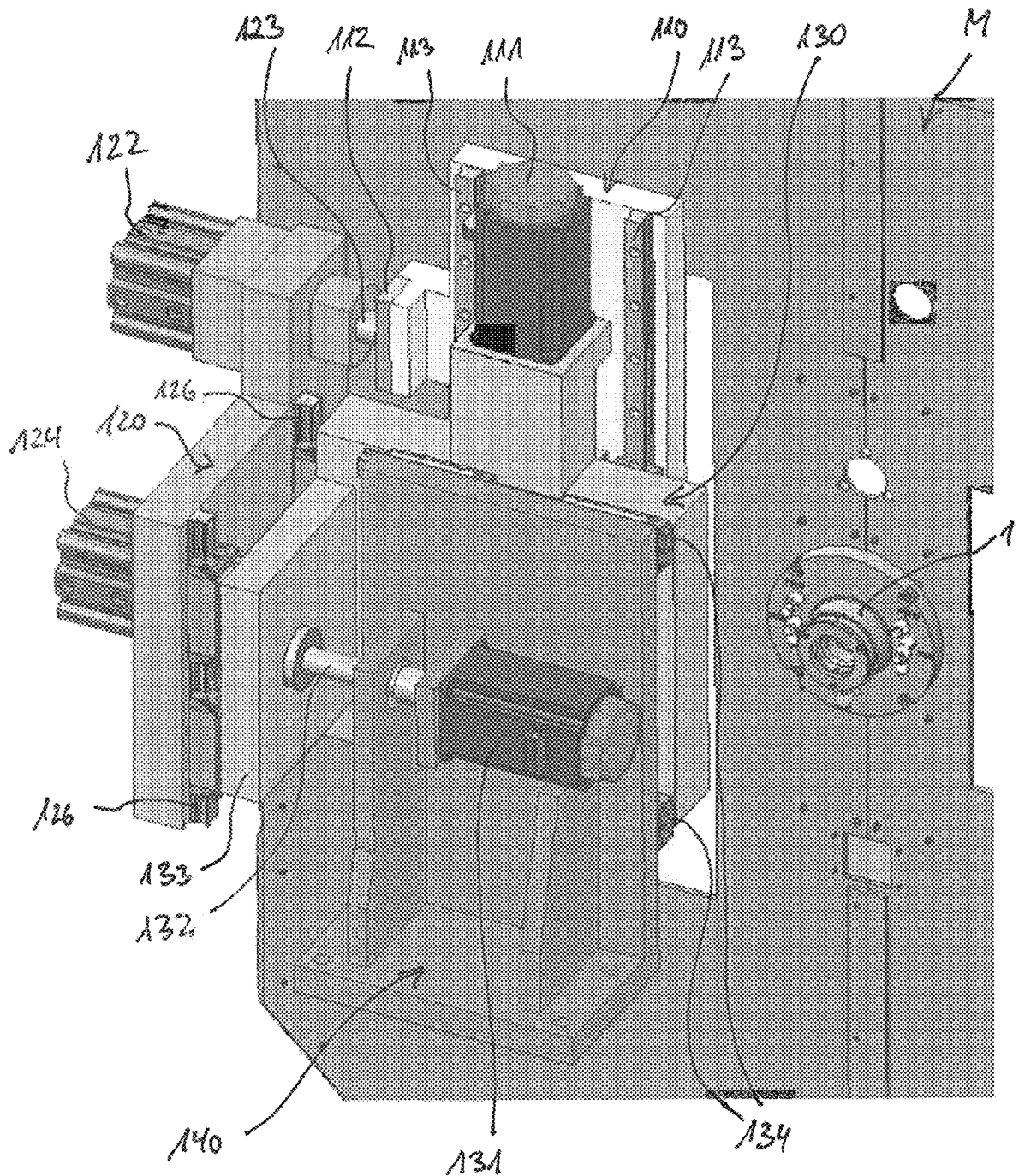
FIG. 1B exemplarily shows a perspective back-side view of the tool carrier assembly of FIG. 1A.

FIG. 1A exemplarily shows a perspective front-side view of a tool carrier assembly 100 according to an exemplary first embodiment. FIG. 1B exemplarily shows a perspective back-side view of the tool carrier assembly 100 of FIG. 1A.

Figure 1C:
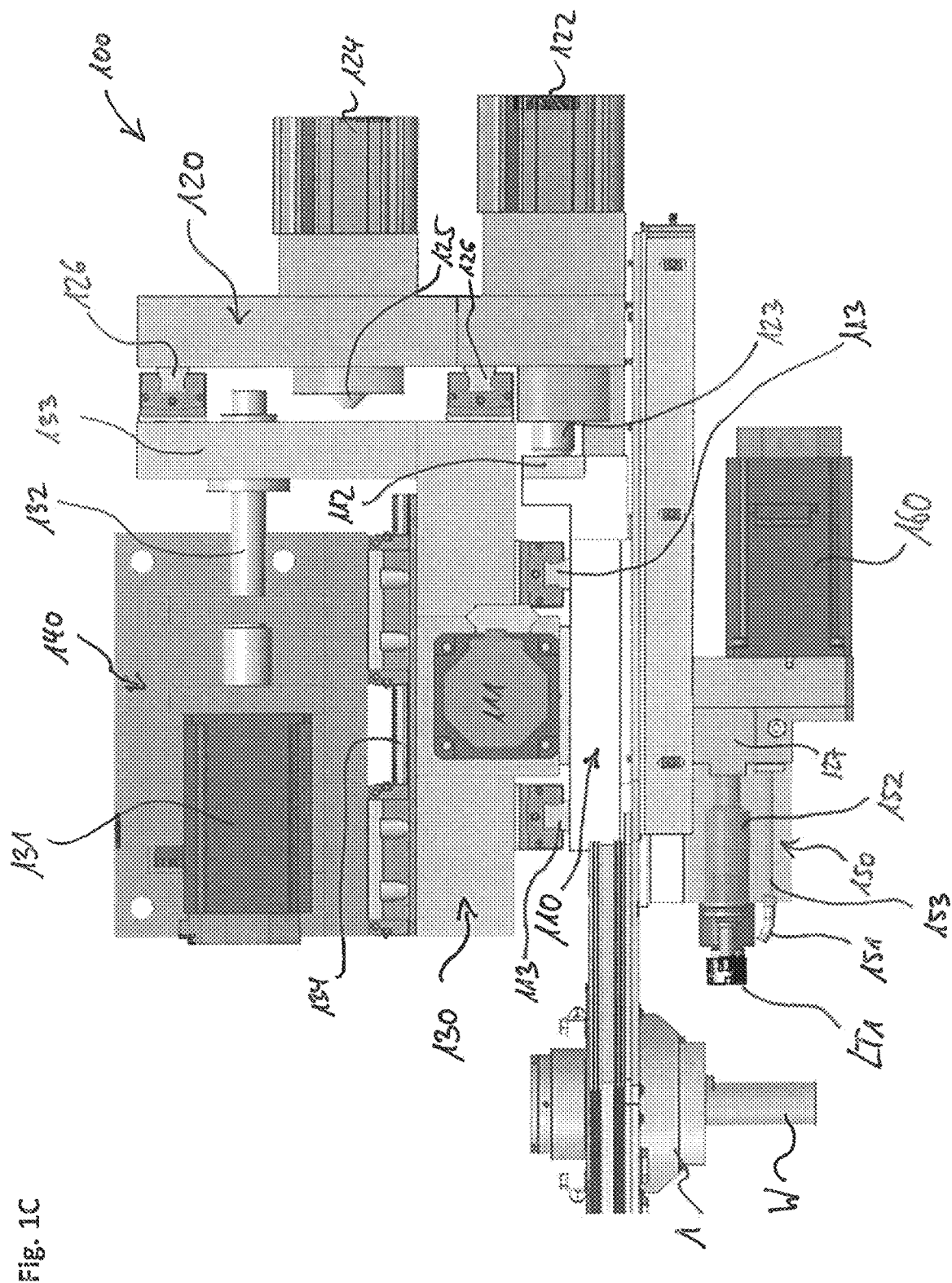
FIG. 1C exemplarily shows a top-side view of the tool carrier assembly of FIG. 1A.

FIG. 1C exemplarily shows a top-side view of the tool carrier assembly 100 of FIG. 1A.

The tool carrier assembly 100 is configured for use at a lathe (machine tool M), which comprises a workpiece-carrying spindle 1 for rotatably driving a workpiece W (such as e.g. a bar) received in the workpiece-carrying spindle 1. Exemplarily, FIGS. 1A to 1C show a rotary bush of the workpiece-carrying spindle 1, and a spindle housing and spindle drive are exemplarily not shown to provide more detailed unobstructed views on the tool carrier assembly 100. It is however readily understood that the workpiece-carrying spindle 1 can further comprise a spindle housing and a spindle drive to rotatably drive the workpiece W about the spindle axis of the spindle 1. Such spindle may be fixed or arranged on a movable spindle slide that may be movable into a direction of the spindle axis (generally referred to as Z-direction, e.g. by a movable Z-axis spindle).

The tool carrier assembly 100 comprises a first Y-axis slide 110 (first slide) and a second Y-axis slide 120 (second slide) exemplarily both being supported on an X-axis slide 130 (third slide). The X-axis slide 130 is exemplarily supported on a support structure 140 which may be mounted on a machine bed or machine upright (like e.g. in FIG. 1B) of the machine tool M.

An X-axis drive 131 is exemplarily mounted on the support structure 140 (see e.g. FIGS. 1B and 1C) and the X-axis slide 130 is arranged on X-axis guides 134 arranged on the support structure 140. The X-axis drive 131 is configured to drive a linear movement of the X-axis slide 130 in the X-direction, which is exemplarily arranged perpendicular to the direction Z of the spindle axis, by a drive shaft 132 on the X-axis guides 134.

The drive shaft 132 engages with a support portion 133 of the X-axis slide 130 (see e.g. FIGS. 1B and 1C). Exemplarily, the support portion 133 of the X-axis slide 130 further supports Y-axis guides 126 on which the second Y-axis slide 120 is guided to move along the Y-axis guides 126 in the Y-direction. The Y-direction is exemplarily arranged perpendicular to the X-direction and perpendicular to the Z-direction.

The X-axis slide 130 further supports Y-axis guides 113 on which the first Y-axis slide 110 is guided to move along the Y-axis guides 113 in the Y-direction (see e.g. FIGS. 1B and 1C). Exemplarily on an opposite side of the Y-axis guides 113, the first Y-axis slide 110 supports a tool carrier 150. Exemplarily, the tool carrier 150 is fixed to the first Y-axis slide 110 so as to move together with the first Y-axis slide 110 in the Y-direction.

The tool carrier 150 is configured to hold a plurality of tools arranged adjacent to each other along the Y-direction. The plurality of tools exemplarily includes tools of two types, wherein a first type of tools is a fixed tool, referred to be the reference numeral FT, such as a fixed cutting tool, e.g. for performing tuning machining operations on the workpiece W received in the workpiece spindle 1 and being rotationally driven by the spindle 1. A second type of tools is a rotationally-driven tool, also sometimes referred to as a live tool, referred to be the reference numeral LT. Such rotationally-driven tool may for example be embodied by a milling cutting tool or a milling head.

As previously mentioned, the second Y-axis slide 120 is guided to move along the Y-axis guides 126 in the Y-direction, and the second Y-axis slide 120 supports a tool drive unit 160 and a tool carrier Y-axis guide 127 arranged to extend in the Y-direction. The tool carrier 150 mounted to the first Y-axis slide 110 is slidably guided by the tool carrier Y-axis guide 127 in the Y-direction, when the first Y-axis slide 110 and the second Y-axis slide 120 move relative to each other in the Y-direction, e.g. by moving the first Y-axis slide 110 with respect to the second Y-axis slide 120, or vice versa.

Accordingly, when the first Y-axis slide 110 and the second Y-axis slide 120 move relative to each other in the Y-direction, the tool carrier 150 mounted to the first Y-axis slide 110 moves relative to the tool drive unit 160 supported on the second Y-axis slide 120 in the Y-direction.

The tool drive unit 160 includes a tool drive for engaging with one of the plurality of tools held by the tool carrier 150 to rotatably drive said tool, when said tool is arranged at a tool drive position with respect to the tool drive. Exemplarily, the tool arranged at a tool drive position with respect to the tool drive is referenced by the numeral LT1 in FIG. 1A.

The tool carrier assembly 100 further comprises a Y-axis drive 111 exemplarily mounted on the X-axis slide 130 (see e.g. FIG. 1B), and the Y-axis drive 111 is configured to drive a movement of the first Y-axis slide 110 on the Y-axis guides 113 with respect to the X-axis slide 130.

Exemplarily, the Y-axis drive 111 is configured to drive a movement of the first Y-axis slide 110 on the Y-axis guides 113 with respect to the X-axis slide 130 together with the tool carrier 150 in the Y-direction relative to the tool drive position defined by the position of the tool drive unit 160, when the tool drive is disengaged with said tool LT1, to relatively move another tool of the plurality of tools into the tool drive position, by moving the tool carrier 150 in the Y-direction relative to the tool drive unit 160. Accordingly, the drive 111 can be used to change a tool arranged at the tool drive position.

In other words, the Y-axis drive 111 is configured to drive a relative movement of the first Y-axis slide 110 with respect to the second Y-axis slide 120, when the tool drive is disengaged with said tool LT1, to relatively move another tool of the plurality of tools into the tool drive position. Exemplarily, for driving the relative movement of the first Y-axis slide 110 with respect to the second Y-axis slide 120, the Y-axis drive 111 is configured to drive the movement of the first Y-axis slide 110 with respect to the second Y-axis slide 120 in the Y-direction.

Furthermore, a first actuator 122 and a second actuator 124 are arranged on the second Y-axis slide 120 (see e.g. FIGS. 1B and 1C). Exemplarily, the actuators 122 and/or 124 may be realized as hydraulic, pneumatic or electric actuators, and the actuators 122 and 124 are exemplarily configured to actuate respective pistons 123 and 125.

The first actuator 122 is configured to actuate the piston 123 to engage (or disengage) with a piston engagement portion 112 arranged on the first Y-axis slide 110. For example, FIG. 1C shows the piston 123 in the engaged state with the engagement portion 112. The second actuator 124 is configured to actuate the piston 125 to engage (or disengage) with a piston engagement portion 135 arranged on the X-axis slide 130. For example, FIG. 1C shows the piston 125 in the disengaged state with the engagement portion 135 (see also FIG. 1D described below).

Figure 1D:
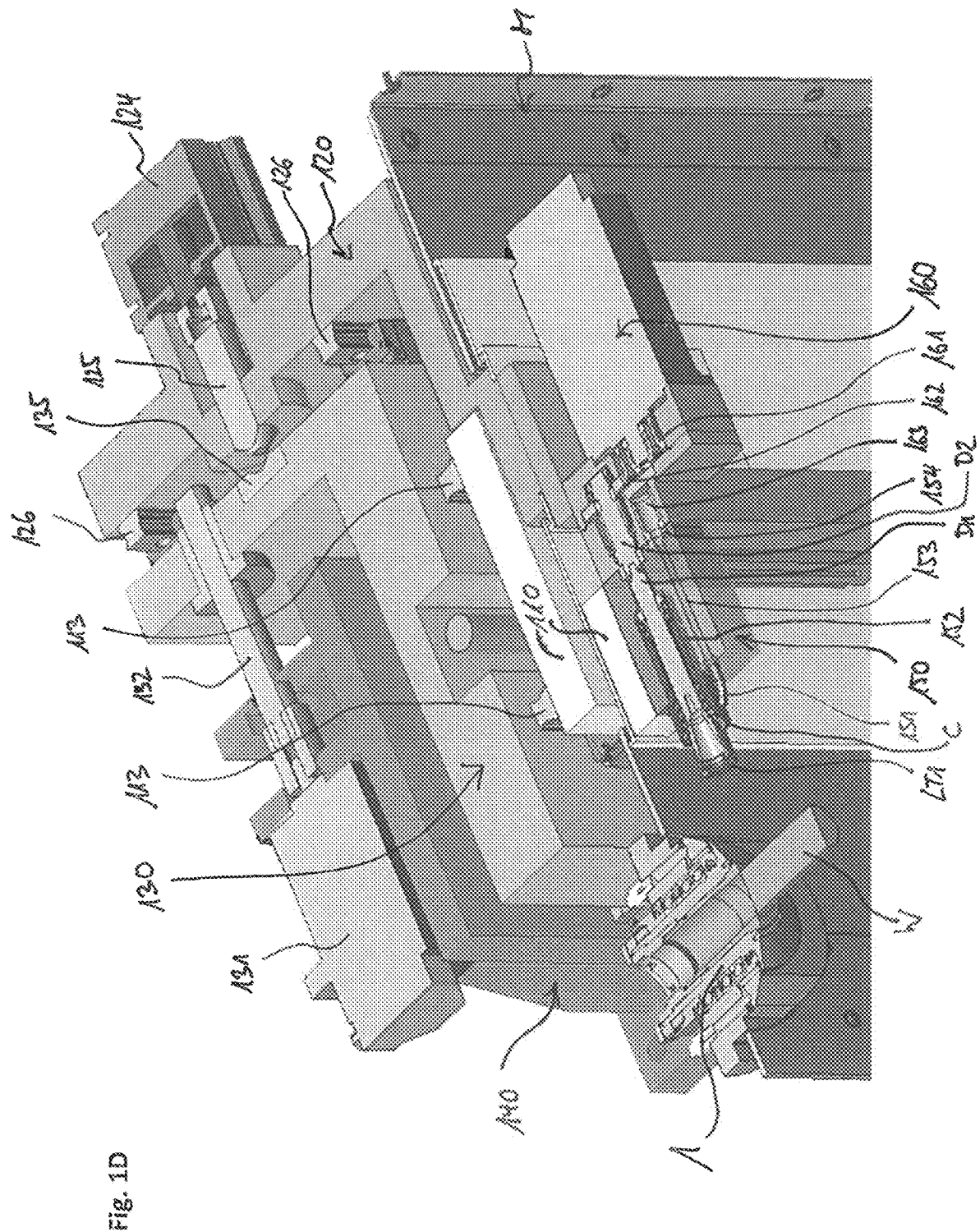
FIG. 1D exemplarily shows a view of a horizontal section through the tool carrier assembly of FIG. 1A.

In the state of FIGS. 1C and 1D, the piston 125 is in the disengaged state with the engagement portion 135 and the piston 123 is in the engaged state with the engagement portion 112, so that a releasable fixed attachment is actuated between the first and second Y-axis slides 110 and 120. Accordingly, when driving movement of the first Y-axis slide 110 in the Y-direction by the Y-axis drive 111, the second Y-axis slide 120 also moves in the Y-direction due to the engagement of the piston 123 with the engagement portion 112.

Accordingly, in the state of FIGS. 1C and 1D with the piston 125 being in the disengaged state with the engagement portion 135 and the piston 123 being in the engaged state with the engagement portion 112, the Y-axis drive 111 is enabled to drive a joint movement of the first and second Y-axis slides 110 and 120 in the Y-direction, when the tool drive is engaged with said tool LT1 in the tool drive position, for example, for machining a workpiece received in the workpiece-carrying spindle 1 with said tool LT1.

On the other hand, when the tool drive is disengaged with said tool LT1 and when the piston 125 is actuated to be in the engaged state with the engagement portion 135 and the piston 123 is in the disengaged state with the engagement portion 112, the Y-axis drive 111 is enabled to drive the relative movement of the first Y-axis slide 110 with respect to the second Y-axis slide 120, for example, to relatively move another tool of the plurality of tools into the tool drive position, by moving the tool carrier 150 relative to the tool drive unit 160 in the Y-direction.

Figure 1E:
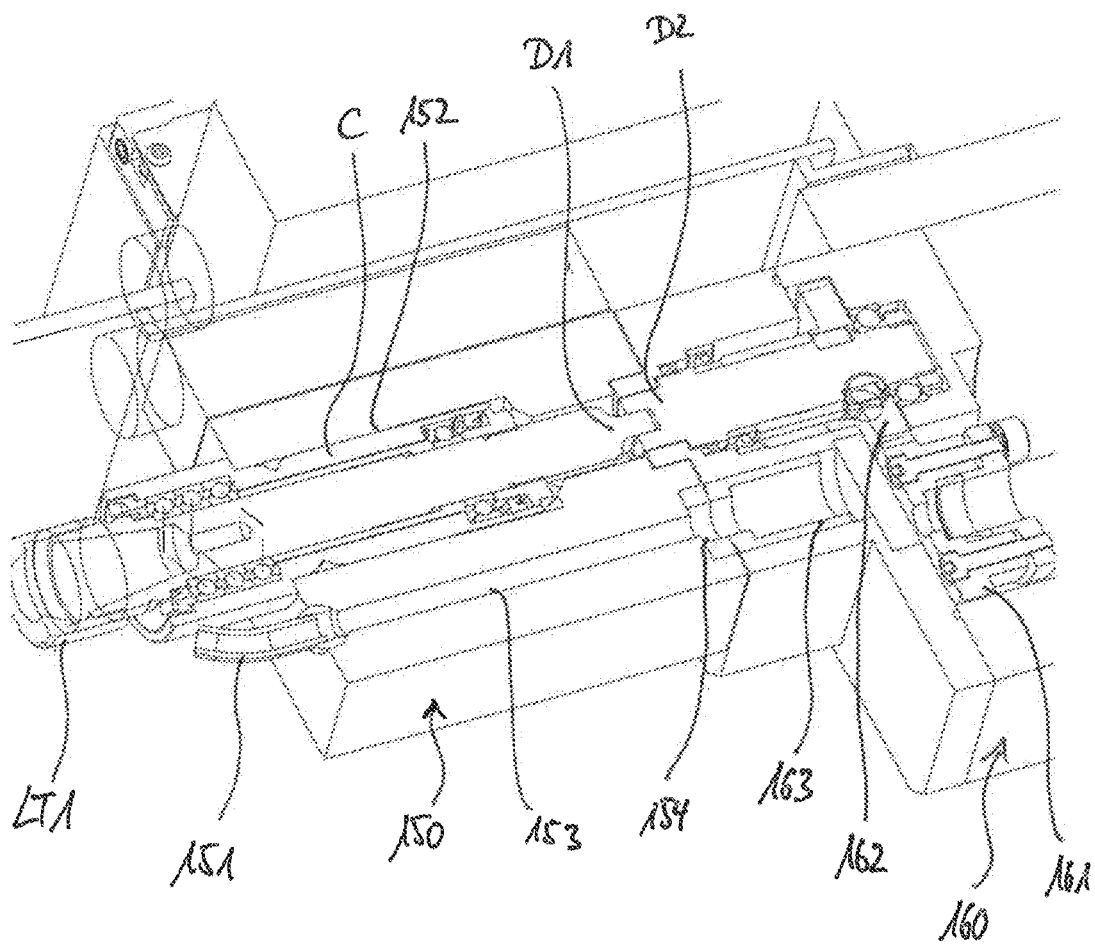
FIG. 1E exemplarily shows a view of a horizontal section through the tool carrier and tool drive unit of the tool carrier assembly of FIG. 1A.

FIG. 1D exemplarily shows a view of a horizontal section through the tool carrier assembly 100 of FIG. 1A. FIG. 1E exemplarily shows a view of a horizontal section through the tool carrier 150 and tool drive unit 160 of the tool carrier assembly 100 of FIG. 1A.

Exemplarily, the tool carrier 150 comprises, for each tool, a respective associated nozzle 151 for providing cooling liquid for the respective tool. Each of the nozzles 151 is, via a respective cooling liquid channel 153 extending through the tool carrier 150, connected to a respective associated cooling liquid inlet 154 of the tool carrier 150, exemplarily on the other side of the tool carrier 150 opposite to the tool side.

Furthermore, the tool drive unit 160 comprises a cooling liquid supply outlet 163 configured to engage into a releasable connection with the cooling liquid inlet 154 of the tool carrier 150 which is connected with the respective nozzle 151 associated with the tool LT1 arranged at the tool drive position with respect to the tool drive of the tool drive unit 160, see e.g. FIGS. 1D and 1E.

Accordingly, the tool drive unit 160 can be supplied with by a pressurized cooling liquid system providing cooling liquid to the cooling liquid supply outlet 163 arranged to engage with the particular cooling liquid inlet 154 of the tool carrier 150 associated with the tool currently positioned at the tool drive position.

When the tool drive unit 160 is moved relative to the tool carrier 150 in the Y-direction, e.g. to change the engaged tool at the tool drive position, when the next tool is engaged by the tool drive at the tool drive position, also the respective associated cooling liquid inlet 154 of the tool carrier 150 associated with the tool then positioned at the tool drive position engages with the cooling liquid supply outlet 163 so as to supply cooling liquid to the cooling liquid inlet 154 through the respective channel 153 to the respective nozzle 151.

The tool carrier 150 exemplarily comprises, for each tool, a respective tool receiving portion 152 for respectively receiving the tools such as the fixed tools FT and the rotatably-driven tools LT (live tools).

The fixed tools FT may be fixed at the front portion of the respective tool receiving portion 152 placed at a distance from a drive element of the tool drive, since the fixed tools do not require any driving movement by the tool drive.

On the other hand, exemplarily, rotatably driven tools LT are held and rotatably supported in respective tool holder cartridges C (tool cartridge) received in the respective tool receiving portions 152. Each tool holder cartridge C includes, at its end on an opposite side with respect to the tool LT held by the respective tool holder cartridge C, a respective drive element D1 of a tongue-and-groove coupling configured to releasably engage with an opposite drive element D2 of the tongue-and-groove coupling included in the tool drive, when said tool LT1 held by the respective tool holder cartridge C is arranged at the tool drive position with respect to the tool drive, see e.g. FIGS. 1D and 1E.

Figure 1F:
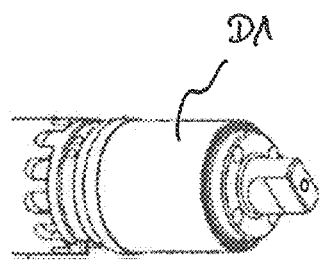
FIG. 1F exemplarily shows a perspective view of a drive element on an end portion of a tool cartridge.

FIG. 1F exemplarily shows a perspective view of a drive element D1 on an end portion of a tool cartridge, which is exemplarily formed as a tongue element of the tongue-and-groove coupling, arranged to engage with its opposite groove on the opposite drive element D2 of the tongue-and-groove coupling included in the tool drive. The arrangement of the tongue and groove elements may also be exchanged in other exemplary embodiments.

By such exemplary mechanism, when the tongue-and-groove coupling is arranged so that the width of the drive element D1 and the groove of the opposite drive element D2 extend in the Y-direction, the tongue-and-groove coupling can be disengaged by relative movement of the drive elements in the Y-direction, when moving the tool carrier 150 relative to the tool drive unit 160 in the Y-direction, e.g. to engage the next tool cartridge's drive element D1 with the groove of the opposite drive element D2.

Exemplarily, the tool drive unit 160 includes a gearbox having a driving gear 161 (driven by the drive of the drive unit 160) driving a driven gear 162 attached with the driving element D2.

Figure 2A:
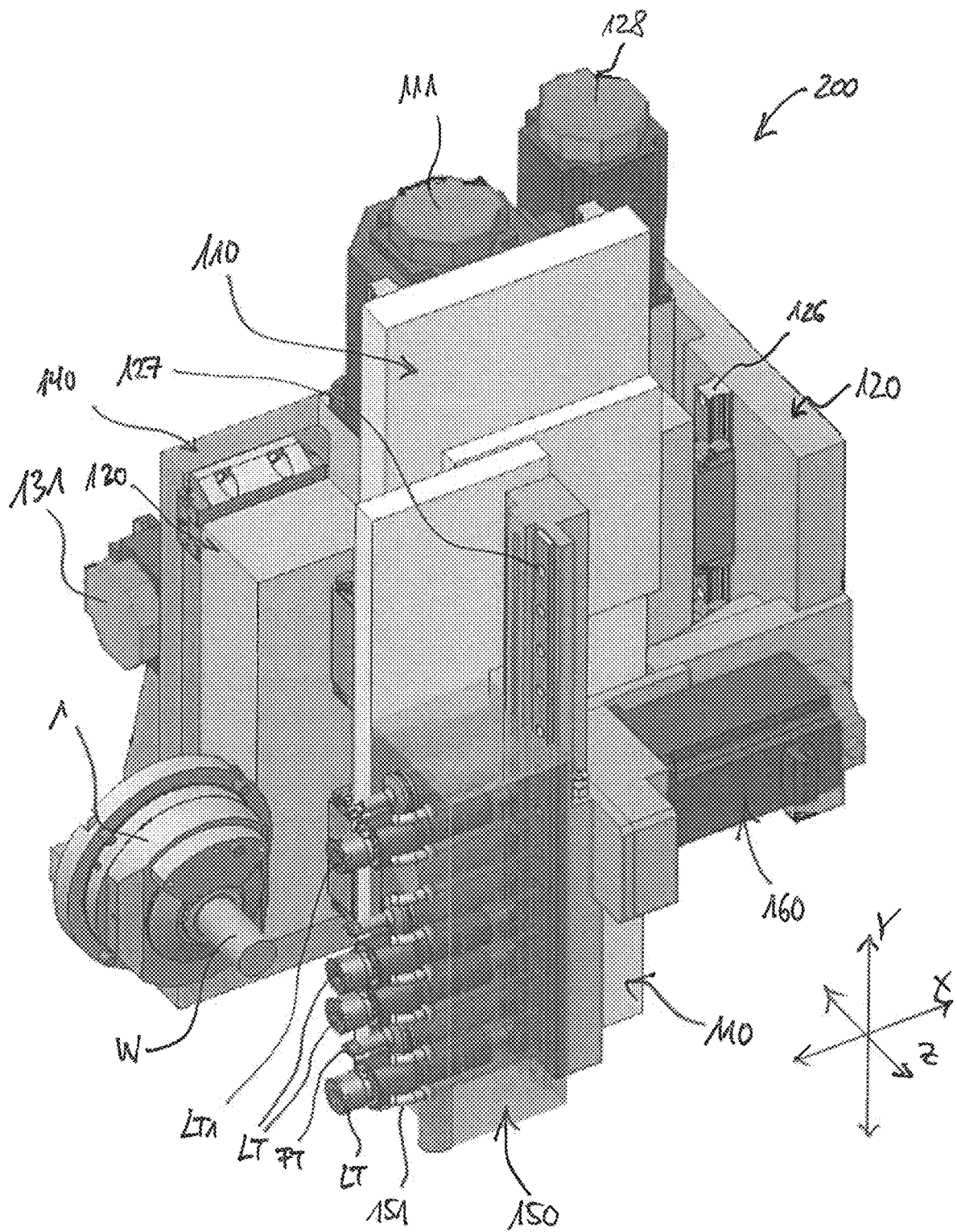
FIG. 2A exemplarily shows a perspective front-side view of a tool carrier assembly according to an exemplary second embodiment.
Figure 2C:
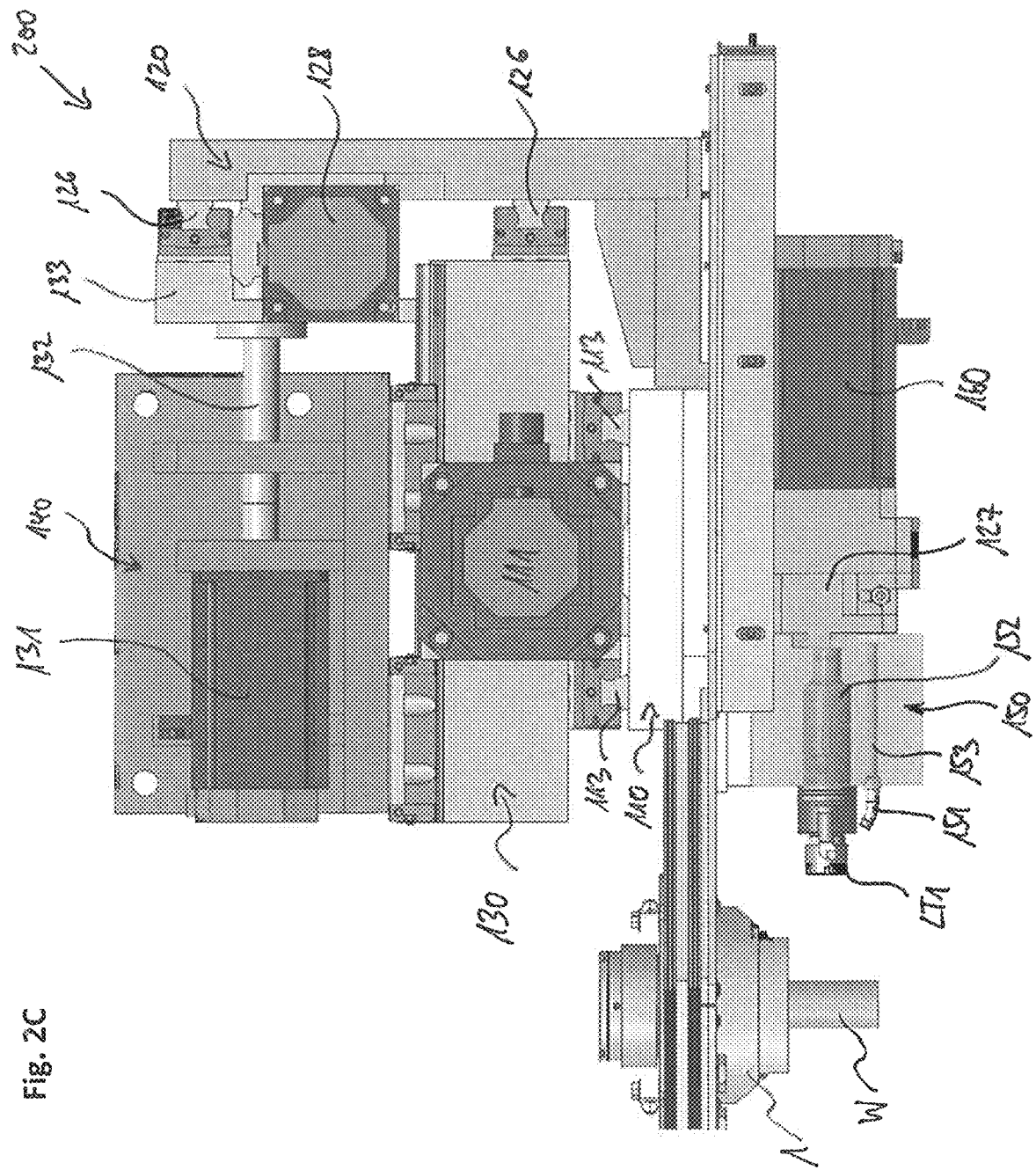
FIG. 2C exemplarily shows a top-side view of the tool carrier assembly of FIG. 2A.

FIG. 2A exemplarily shows a perspective front-side view of a tool carrier assembly 200 according to an exemplary second embodiment. FIG. 2B exemplarily shows a perspective back-side view of the tool carrier assembly 200 of FIG. 2A. FIG. 2C exemplarily shows a top-side view of the tool carrier assembly 200 of FIG. 2A.

In the following, the description will focus on differences compared to the above first embodiment, and like features are denoted by same reference numerals not described again for conciseness of the present description.

Similar to the first embodiment, two independent Y-axis slides 110 and 120 are provided, supported slidably in the Y-direction on the X-axis slide 130. However, in contrast to the first embodiment, two independent separate Y-axis drives 111 and 128 are provided. Specifically, the additional Y-axis drive 128 is provided, exemplarily supported on the X-axis slide (see e.g. FIG. 2B), to drive a movement of the second Y-axis slide 120 in the Y-direction, and the actuators 122 and 124 are exemplarily omitted.

When the tool drive is disengaged with said tool LT1, the Y-axis drive 111 is enabled to drive the relative movement of the first Y-axis slide 110 with respect to the second Y-axis slide 120 and/or the Y-axis drive 128 is enabled to drive the relative movement of the second Y-axis slide 120 with respect to the first Y-axis slide 110, for example, to relatively move another tool of the plurality of tools into the tool drive position, by moving the tool carrier 150 relative to the tool drive unit 160 in the Y-direction.

On the other hand, by synchronized control of the Y-axis drives 111 and 128, the Y-axis drive 111 and the Y-axis drive 128 are enabled to synchronously drive a joint movement of the first and second Y-axis slides 110 and 120 in the Y-direction, e.g. under synchronized control by an NC-control unit of the machine tool, when the tool drive is engaged with said tool LT1 in the tool drive position, for example, for machining a workpiece received in the workpiece-carrying spindle 1 with said tool LT1. Such control can be realized, for example, if one of the Y-axis drives 111 and 128 is controlled as a master drive and the other one of the Y-axis drives 111 and 128 is controlled as a slave drive.

Figure 3A:
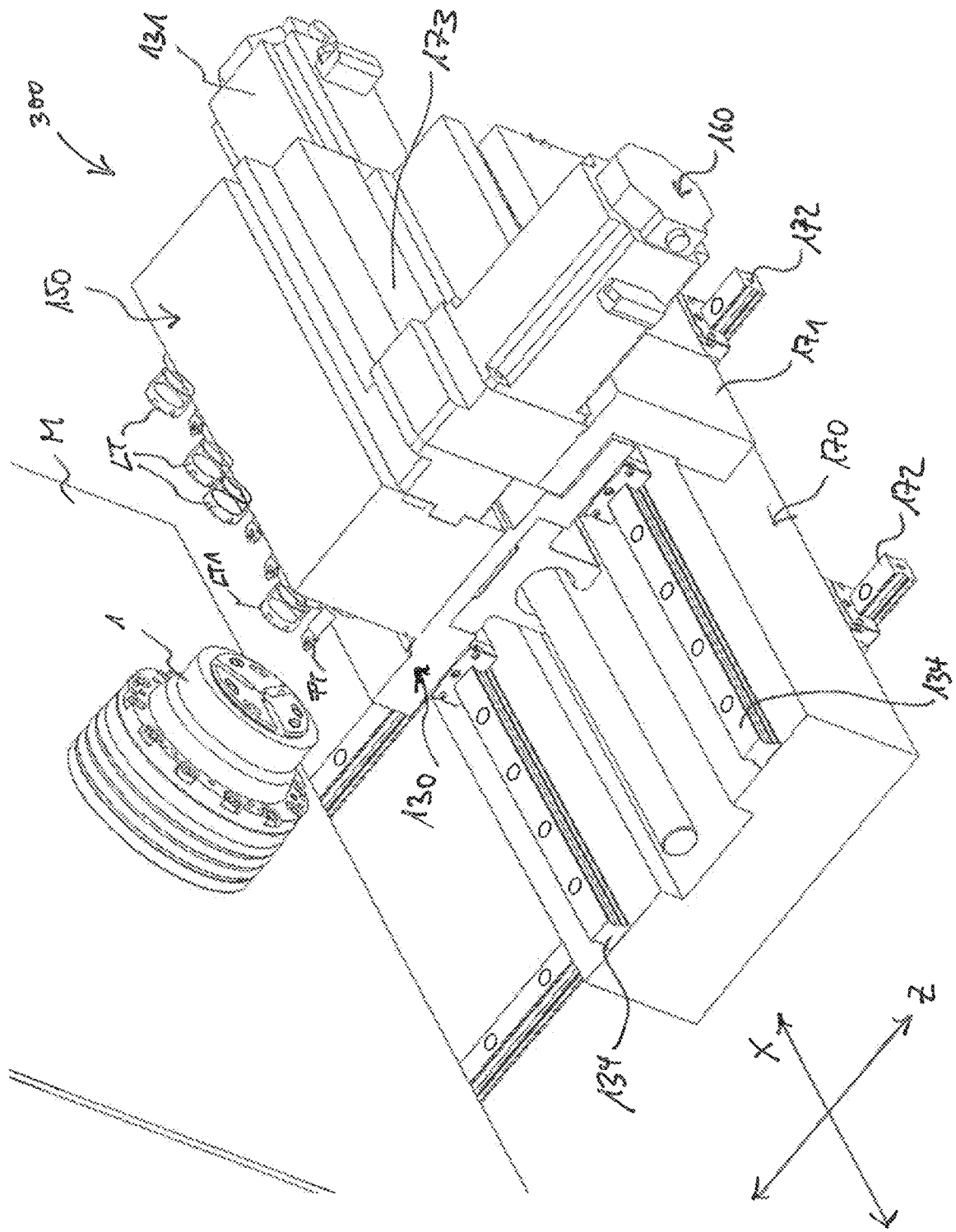
FIG. 3A exemplarily shows a perspective top-side view of a tool carrier assembly according to an exemplary third embodiment.
Figure 3B:
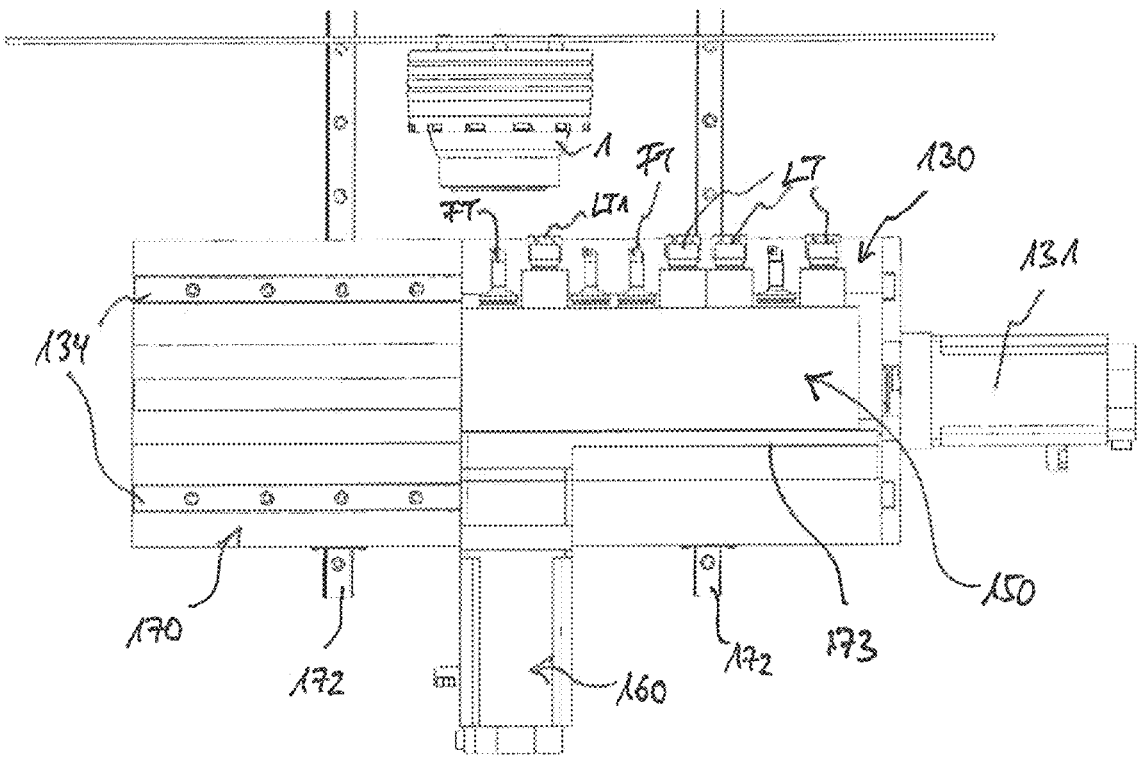
FIG. 3B exemplarily shows a top-side view of the tool carrier assembly of FIG. 3A.
Figure 3C:
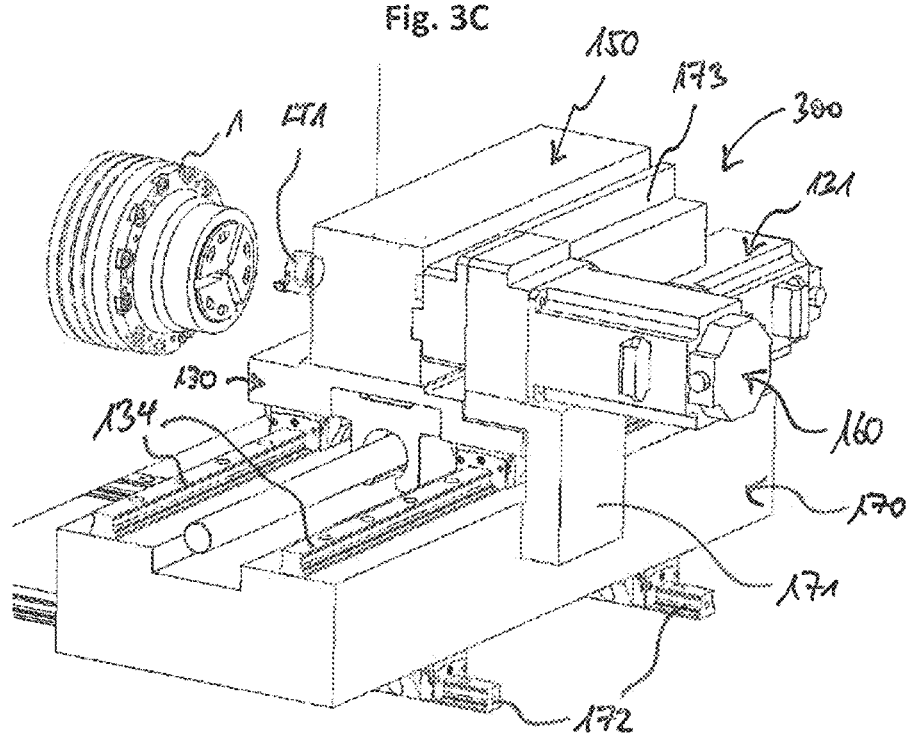
FIG. 3C exemplarily shows a perspective front-side view of the tool carrier assembly of FIG. 3A.

FIG. 3A exemplarily shows a perspective top-side view of a tool carrier assembly 300 according to an exemplary third embodiment. FIG. 3B exemplarily shows a top-side view of the tool carrier assembly 300 of FIG. 3A. FIG. 3C exemplarily shows a perspective front-side view of the tool carrier assembly 300 of FIG. 3A.

In the following, the description will focus on differences compared to the above first embodiment, and like features are denoted by same reference numerals not described again for conciseness of the present description.

In the third embodiment, the first slide, on which the tool carrier 150 is supported, is exemplarily realized as an X-slide 130 (first slide) arranged to move in the X-direction perpendicular to the Z-direction of the spindle axis. While in the above embodiments, the tools held by the tool carrier 150 were exemplarily arranged with their tool axes perpendicular to the spindle axis, the third embodiment exemplarily has the tools held by the tool carrier 150 were exemplarily arranged with their tool axes in parallel with the spindle axis.

The X-slide 130 is exemplarily guided on X-axis guides 134 mounted on a Z-axis slide 170 (second slide) exemplarily guided on Z-axis guides 172 extending in the Z-direction in parallel with the spindle axis of the spindle 1. The X-slide 130 is supported on the Z-axis slide 170.

Furthermore, the tool drive unit 160 is fixedly mounted on a support portion 171 of the Z-axis slide 170, whereas the tool carrier 150 is mounted on the X-slide 130, and the tool carrier 150 is slidably guided on a tool carrier X-axis guide 173 (similar to tool carrier Y-axis guide 127 above) which extends in the X-direction. The movement of the X-slide 130 together with the tool carrier 150 in the Y-direction, in particular with respect to the Z-axis slide 170 and the tool drive unit 160, is driven by the X-axis drive 131.

When the tool drive is disengaged with said tool LT1, the X-axis drive 131 is enabled to drive the relative movement of the X-axis slide 130 with respect to the Z-axis slide 170 and the tool drive unit 160, for example, to relatively move another tool of the plurality of tools into the tool drive position, by moving the tool carrier 150 relative to the tool drive unit 160 in the X-direction.

By the above exemplary embodiments and aspects, it is advantageously possible to provide a tool carrier assembly which is compact and enabled to hold a plurality of tools, including fixed tools for turning operations and live tools for milling and/or boring operations performed on the workpiece held in the workpiece spindle, while a compact tool drive unit having a single compact drive can be provided, enabled to drive a respective live tool positioned at the tool drive position, and providing cooling fluid to the respective tool at the same time. Furthermore, it is conveniently possible to efficiently change the engaged/driven tool by controlling a relative movement of the tool drive unit with respect to the tool carrier in the direction of the tool arrangement of tools arranged next to each other.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible. Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

REFERENCE NUMERALS

M machine tool
1 workpiece spindle
W workpiece
FT fixed tool
LT live tool (rotatably-driven tool)
LT1 live tool in tool drive position
C tool cartridge
D1 first tool drive element (e.g. tongue-and-groove coupling)
D2 first tool drive element (e.g. tongue-and-groove coupling)
100 tool carrier assembly (first exemplary embodiment)
200 tool carrier assembly (second exemplary embodiment)
300 tool carrier assembly (third exemplary embodiment)
110 first Y-axis slide
111 Y-axis drive/first Y-axis drive
112 first piston engagement portion
113 first Y-axis guides
120 second Y-axis slide
122 first actuator
123 first piston
124 second actuator
125 second piston
126 second Y-axis guides
127 tool carrier Y-axis guide
128 second Y-axis drive
130 X-axis slide
131 X-axis drive
132 X-axis drive shaft
133 support portion
134 X-axis guides
135 second piston engagement portion
140 support structure
150 tool carrier
151 nozzle
152 tool receiving portion
153 cooling liquid channel
154 cooling liquid inlet
160 tool drive unit
161 driving gear
162 driven gear
163 cooling liquid supply outlet
170 Z-axis slide
171 support portion
172 Z-axis guides
173 tool carrier X-axis guide

The invention claimed is:

1. Tool carrier assembly for use at a machine tool, which machine tool comprises at least one workpiece-carrying spindle for rotatably driving a workpiece received in the at least one workpiece-carrying spindle, the tool carrier assembly comprising:
   a first slide being movable in a first direction, the first direction being arranged transverse or perpendicular to a spindle axis of rotation of the at least one workpiece-carrying spindle, a tool carrier configured to hold a plurality of tools arranged adjacent to each other along the first direction, the tool carrier being supported on the first slide, a tool drive unit including a tool drive for engaging with one tool of the plurality of tools held by the tool carrier to rotatably drive said one tool, when said one tool is arranged at a tool drive position with respect to the tool drive, and a drive mechanism for driving movement of the first slide together with the tool carrier in the first direction relative to the tool drive position, when the tool drive is disengaged with said one tool, to relatively move another tool of the plurality of tools into the tool drive position.

2. Tool carrier assembly according to claim 1, further comprising a second slide supporting the tool drive unit, the second slide being movable in the first direction, wherein the drive mechanism is configured to drive movement of the first and second slides in the first direction.

3. Tool carrier assembly according to claim 2, wherein the drive mechanism is configured to drive a joint movement of the first and second slides in the first direction, when the tool drive is engaged with said one tool, for machining, via said one tool, a workpiece received in the at least one workpiece-carrying spindle.

4. Tool carrier assembly according to claim 2, wherein the drive mechanism is configured to drive a relative movement of the first slide with respect to the second slide, when the tool drive is disengaged with said one tool, to relatively move said another tool of the plurality of tools into the tool drive position, wherein, for driving the relative movement of the first slide with respect to the second slide, the drive mechanism is configured to drive at least one of a movement of the first slide with respect to the second slide in the first direction and a movement of the second slide with respect to the first slide in the first direction.

5. Tool carrier assembly according to claim 2, wherein the drive mechanism includes a first drive for driving movement of the first slide in the first direction and a second drive for driving movement of the second slide in the first direction.

6. Tool carrier assembly according claim 5, wherein the first and second drives are configured to be operated in a synchronized operation mode, for synchronized driving of joint movement of the first and second slides in the first direction by the first and second drives, and/or at least one of the first and second drives is configured to be operated in an independent operation mode for driving relative movement of the first slide in the first direction and with respect to the second slide by the at least one of the first and second drives.

7. Tool carrier assembly according to claim 2, wherein the drive mechanism includes a drive for driving movement of either the first slide in the first direction or both the first slide and the second slide in the first direction, and the drive mechanism includes a releasable fixing mechanism configured to actuate a releasable fixed attachment between the first and second slides for enabling the drive mechanism drive to drive a joint movement of the first and second slides in the first direction.

8. Tool carrier assembly according to claim 7, wherein the releasable fixing mechanism is further configured to release the fixed attachment between the first and second slides for enabling the drive mechanism drive to drive relative movement of the first slide with respect to the second slide in the first direction.

9. Tool carrier assembly according to claim 7, wherein the releasable fixing mechanism includes an electric, hydraulic or pneumatic first actuator, arranged on the second slide, the first actuator including a portion that is configured to engage with an engagement portion arranged on the first slide.

10. Tool carrier assembly according to claim 7, wherein the releasable fixing mechanism includes an electric, hydraulic or pneumatic actuator, arranged on the second slide, the actuator including a portion that is configured to engage with, when the drive mechanism drive is driving relative movement of the first slide with respect to the second slide, an engagement portion arranged on a support part which supports the second slide.

11. Tool carrier assembly according to claim 2, further comprising a third slide being movable in a second direction, the second direction being arranged transverse or perpendicular to the first direction and transverse or perpendicular to the spindle axis, wherein the first and/or second slides are arranged on the third slide.

12. Tool carrier assembly according to claim 1, further comprising a second slide supporting the tool drive unit and the first slide, the second slide being movable in a second direction arranged axially or in parallel with the spindle axis.

13. Tool carrier assembly according to claim 1, wherein the tool carrier comprises, for each tool of the plurality of tools, a respective associated nozzle for providing cooling liquid for the respective tool, each nozzle being connected to a respective associated cooling liquid inlet of the tool carrier, and the tool drive unit further comprises a cooling liquid supply outlet configured to engage into a releasable connection with the one of the cooling liquid inlets of the tool carrier which is connected with the respective nozzle associated with said one tool arranged at the tool drive position with respect to the tool drive of the tool drive unit.

14. Tool carrier assembly according to claim 1, wherein the tool carrier comprises, for each tool of the plurality of tools, a respective tool receiving portion for receiving a fixed tool or a rotatably-driven tool, wherein rotatably driven tools are each held and rotatably supported in a respective tool holder cartridge received in the respective tool receiving portion, each tool holder cartridge including, at an end thereof that is on an opposite side with respect to the tool held by the respective tool holder cartridge, a respective drive element of a tongue-and-groove coupling configured to releasably engage with an opposite drive element of the tongue-and-groove coupling included in the tool drive, when said tool held by the respective tool holder cartridge is arranged at the tool drive position with respect to the tool drive.

15. Machine tool, comprising:

at least one workpiece-carrying spindle for rotatably driving a workpiece received in the at least one workpiece-carrying spindle, and a tool carrier assembly according to claim 1.

* * * * *